United States Patent Office 3,544,438
Patented Dec. 1, 1970

3,544,438
NITROSATION OF HYDROCARBONS USING NITRITE ESTERS WITH ACTINIC LIGHT IN THE ABSENCE OF HALIDES
Thijmen J. de Boer and Adrianus Mackor, Amsterdam, Netherlands, assignors to Continental Oil Company, Ponca City, Okla., a corporation of Delaware
No Drawing. Filed Feb. 23, 1968, Ser. No. 707,469
Int. Cl. B01j 1/10
U.S. Cl. 204—162                3 Claims

ABSTRACT OF THE DISCLOSURE

Organic compounds are nitrosated by reaction of a nitrite ester therewith in the presence of actinic light and the substantial absence of halide.

DISCLOSURE OF INVENTION

This invention relates to a novel method of nitrosating organic compounds, particularly hydrocarbon compounds. In one aspect, the invention relates to a novel nitrosation agent. In another aspect, the invention relates to a method for nitrosating with a non-halogen-containing nitrosation agent. In still another aspect, the invention relates to a method for nitrosating wherein deposition of byproducts is reduced.

Nitrosation by using nitrosyl chloride as the nitrosation reagent is well known. For example, U.S. Pat. 2,719,116 discloses a process wherein nitrosyl chloride, the nitrosation agent, is generated in situ by reaction of hydrochloric acid with an alkyl nitrite such as t-butyl nitrate. U.S. Pat. 3,047,482 discloses nitrosyl chloride as the nitrosation reagent, with an alkyl nitrite compound being present as a catalyst. However, such prior art processes require the presence of halogen, usually chlorine, and accordingly suffer the problems of corrosivity associated with such compounds. Further, the actinic light source which is normally used to catalyze such reactions becomes quite inefficient during the course of operation because of the deposition of tarry byproducts on the lamp surface.

It has now been discovered that nitrosation can be effected to produce high product yield and good product selectivity and without disturbing deposits in an atmosphere of low corrosivity by use of a nitrite ester as the nitrosation agent in the presence of actinic light.

The compounds which can be nitrosated by the present process are, in general, all those which can be treated by the prior art processes, but in addition, the present process is very successful in nitrosation of branched-chain hydrocarbons. Suitable feed compounds include but are not limited to cycloparaffins, such as cyclobutane, cyclopentane, cyclohexane, cyclodecane, etc., alkylbenzenes such as toluene, ethylbenzene, diphenylmethane, cumene, etc., n-paraffins such as n-propane, n-butane, n-decane, etc., and branched paraffins such as isobutane, 2,3-dimethylbutane, 2,2,4-trimethylpentane, etc.

The nitrosation agent of this invention can be described broadly as a nitrate ester, and preferably a t-alkyl nitrite such as t-butyl nitrite. Other suitable nitrites include methyl nitrite, ethyl nitrite, propyl nitrite, n-butyl nitrite, sec-butyl nitrite, n-octyl nitrite, and benzyl nitrite.

As mentioned previously, the nitrosation reaction according to the present invention is catalyzed by actinic light. We presently prefer a source having a wavelength in the vicinity of about 400 nm. such as a high pressure mercury lamp, although all wavelengths under about 450 nm. are useful.

The reaction can be be effected over a broad range of conditions. Pressure need only be sufficient to maintain the feed in liquid phase, so in many instances, atmospheric pressure suffices. Suitable temperatures range from about —80° C. to about +80° C., although best yields are obtained from about 0° C. to about 20° C.; further, desposition of byproduct cis-dimer is observed at low temperatures. No solvent or diluent need be used unless the feed material is a solid at reaction conditions, in which instance a solvent, inert to the system, is used simply to effect liquefaction of the feed. In certain instances, a diluent is desirable in order to reduce the final concentration of nitrosated product, and thus reduce the formation of dimer byproduct. Suitable inert solvents and diluents include benzene, $CFCl_3$, etc. In other instances, e.g., when the nitrosation product has a low volatility, decomposition can be reduced or avoided by removing the product as it is formed, for instance in a Soxhlet apparatus.

The nitrosation products of this invention find various uses in the art. For example, nitrosocyclohexane can be isomerized to cyclohexanone oxime, which in turn can be converted by the Beckmann rearrangement to caprolactam, a monomer which is polymerized to form a nylon. Open chain oximes, isomerized from the corresponding nitrosates, find use as paint anti-skinning agents.

The invention and its various advantages can be further understood by consideration of the following examples, which are submitted as being illustrative and not limiting.

EXAMPLE I

Cyclohexane in the amount of 250 g. except as noted was nitrosated using t-butylnitrite as the nitrosation agent, with 6 hours irradiation time in each instance except in Run 6, which was about 48 hours, with the following results:

|  | Run 1 | Run 3 | Run 4 | Run 5 | Run 6 |
| --- | --- | --- | --- | --- | --- |
| t-Butylnitrite, g | 4.38 | 2.58 | 2.06 | 3.36 [1] | 16.36 [2] |
| Temp., °C | 21 | 40 | 40 | 21 | 7–10 |
| Light source | H | H | H | P | Ph+F |
| Crude product, g | 4.1 | 2.23 | 2.1 | 2.94 | 16.40 |
| Nitroso compound, g | 2.4 | 1.23 | 0.86 | 1.58 | 13.50 |
| Nitroso compound, percent | 50 | 43 | 38 | 42 | 75.5 |
| Oxime, g | 0.55 | 0.54 | 0.44 | 0.37 | 1.04 |
| Oxime, percent | 12 | 19 | 20 | 10 | 6 |
| Nitrite conversion, percent | 62 | 62 | 58 | 52 | 81.5 |

[1] In this run, 400 g. cyclohexane was charged.
[2] In this run, 2,500 g. cyclohexane was charged.

"H" identifies a Hanau PL321 light source, "P" is a Phillips tl 40/08 tube emitting in the 320–400 nm. (or millimicron) range wavelength, and "Ph+F" is a filtered Phillips SP500 watt lamp transmitting wavelengths around 400 nm. In the first run above, a substantial deposition of cis-nitroso dimer was noted on the lamp, while in the latter runs, the deposit was slight or absent. The trans-nitroso dimer, being soluble, does not desposit. In additional runs, not shown, it was determined that product yield declines above about 60° C. In still other runs, it was determined that reaction rate using the "P" source is about double that obtained when using the "H" source, other conditions being comparable. Overall conversion to nitrite was not improved, however.

EXAMPLE II

Toluene was nitrosated with t-butyl nitrite under conditions similar to those of Example I, at 0° C. Product obtained was 77% of nitrosotoluene dimer.

EXAMPLE III

The effect of chain branching in the nitrosation agent was studied on cyclohexane at the reaction conditions of Example I, Run 6, with slow addition of nitrate ester in a closed system, with the following results:

| Nitrosation agent | Reaction products, percent | | |
|---|---|---|---|
| | Nitroso dimer | Oxime | Total |
| n-Butyl nitrite | 39.5 | 10.5 | 50 |
| Sec-butyl nitrite | 58 | 4 | 62 |
| t-Butyl nitrite | 75.5 | 6 | 81.5 |

The resulting nitrosocyclohexane trans-dimer can be isomerized to cyclohexanone oxime, in yields of at least 90%, for example by refluxing with a low molecular weight alcohol or by heating at, e.g., 100–110° C. in an inert atmosphere; the conversion also can be effected by irradiation with visible light.

EXAMPLE IV

Cyclopentane was nitrosated, using t-butylnitrite, under conditions similar to those of Example I. In this case, 60% of trans-azodioxycyclopentane and 19% of cyclopentanone oxime were formed.

EXAMPLE V 2,3-dimethylbutane was nitrosated by refluxing it with t-butylnitrite in a soxhlet apparatus with radiation; 78% of 2,3-dimethyl-1-nitrosobutane was obtained. Visible light of wavelength greater than 500 nm. was excluded in this experiment.

EXAMPLE VI

Other hydrocarbons were nitrosated, with the following results: toluene, 77% yield; ethylbenzene, α-phenyl nitrosoethane dimer 34% and acetophenone oxime 38%; diphenylmethane, 68% yield; n-propane, 7% yield; and n-butane, 2-nitrosobutane dimer 55%, 1-nitrosobutane dimer 6%, and (2)-butanone oxime 7%. Also, for cyclobutane, 57%; for cyclododecane, 76% nitroso dimer and less than 1% oxime; and for isobutane by the Soxhlet technique of Example V, 63% t-nitroso compound.

Having thus described the invention by providing specific examples thereof, it is to be understood that no undue limitations or restrictions are to be drawn by reason thereof and that many variations and modifications are within the scope of the invention.

What is claimed is:
1. The method of nitrosating a hydrocarbon selected from the group consisting of paraffins, cycloparaffins, and alkyl aromatics which comprises reacting it with a nitrite ester selected from the group consisting of alkyl nitrites and benzyl nitrite in the presence of actinic light having a wavelength below about 450 nm. and in the substantial absence of halogen.
2. The method of claim 1 wherein the reacting is effected at a temperature between about 0° C. and about 20° C.
3. The method of claim 2 wherein said hydrocarbon comprises cyclohexane and said ester comprises t-butyl nitrite.

References Cited
UNITED STATES PATENTS 2,985,572   5/1961   Von Schickh et al. ___ 204—162

OTHER REFERENCES

Dogering: "An Outline of Nitrogen Compounds," University Lithoprinters, Ypsilanti, Mich., 1950, pp. 107–111 and 153 to 159.

BENJAMIN R. PADGETT, Primary Examiner